D. S. KENNEDY.
TYPOGRAPHICAL MACHINE.
APPLICATION FILED FEB. 1, 1913.

1,104,512.

Patented July 21, 1914.

7 SHEETS—SHEET 4.

WITNESSES:

INVENTOR.
David S. Kennedy
BY
Rogers, Kennedy & Campbell
ATTORNEYS

D. S. KENNEDY.
TYPOGRAPHICAL MACHINE.
APPLICATION FILED FEB. 1, 1913.
1,104,512.
Patented July 21, 1914.
7 SHEETS—SHEET 5.
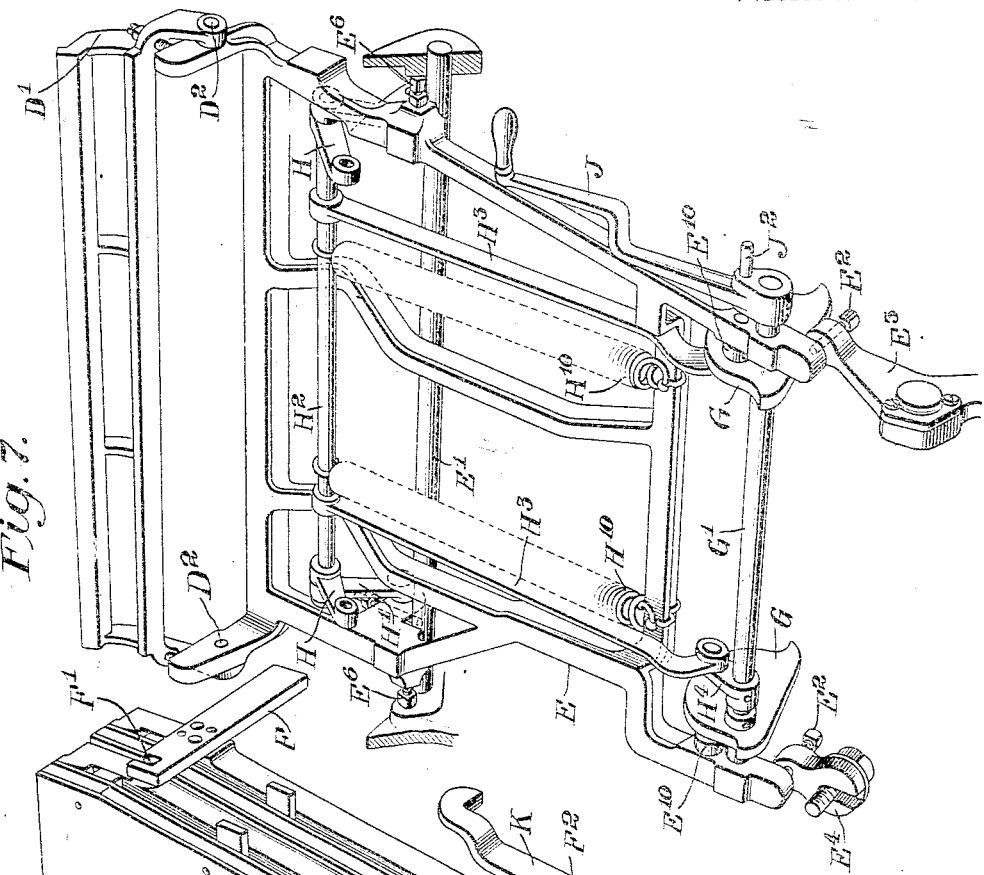
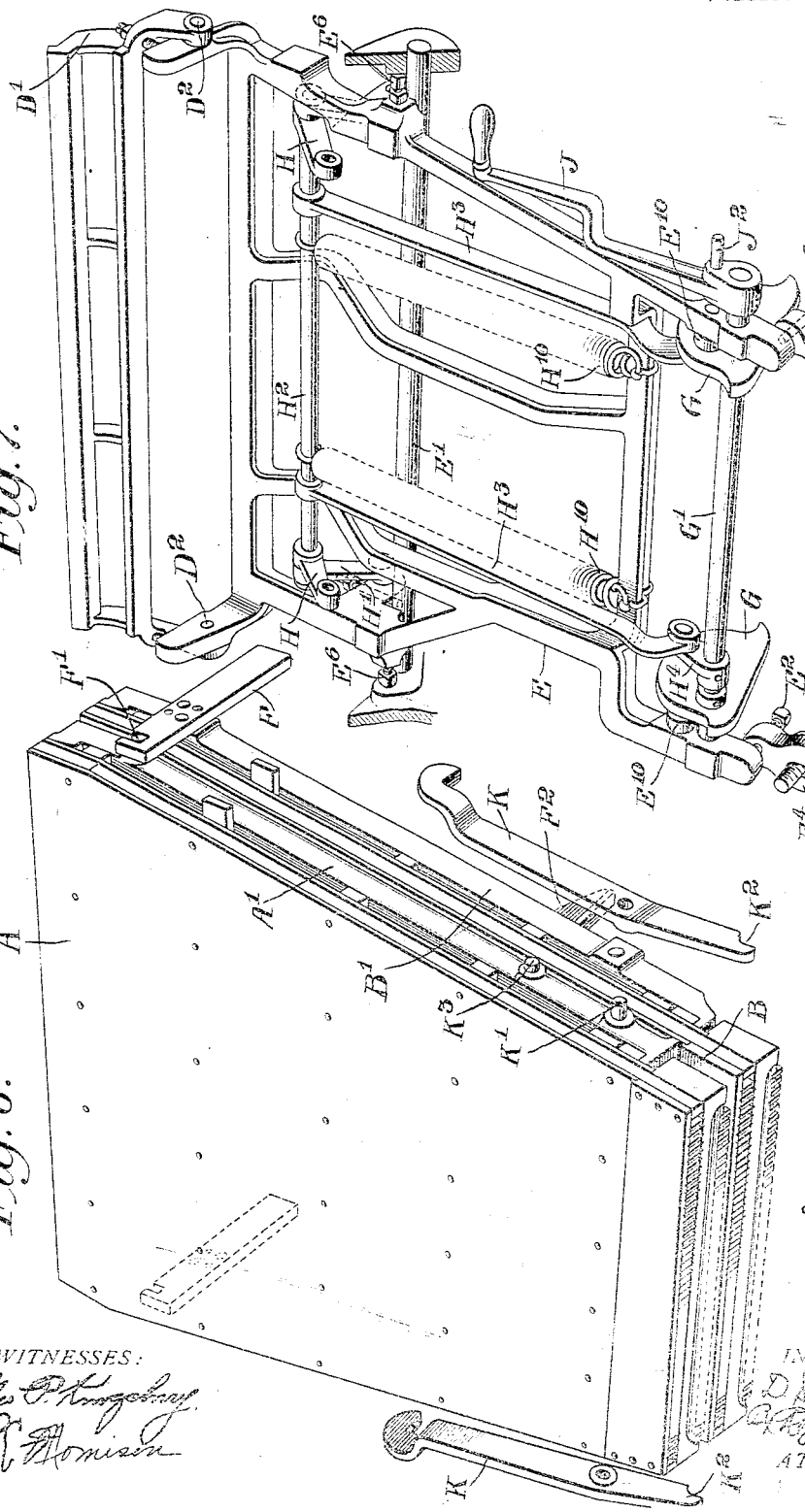

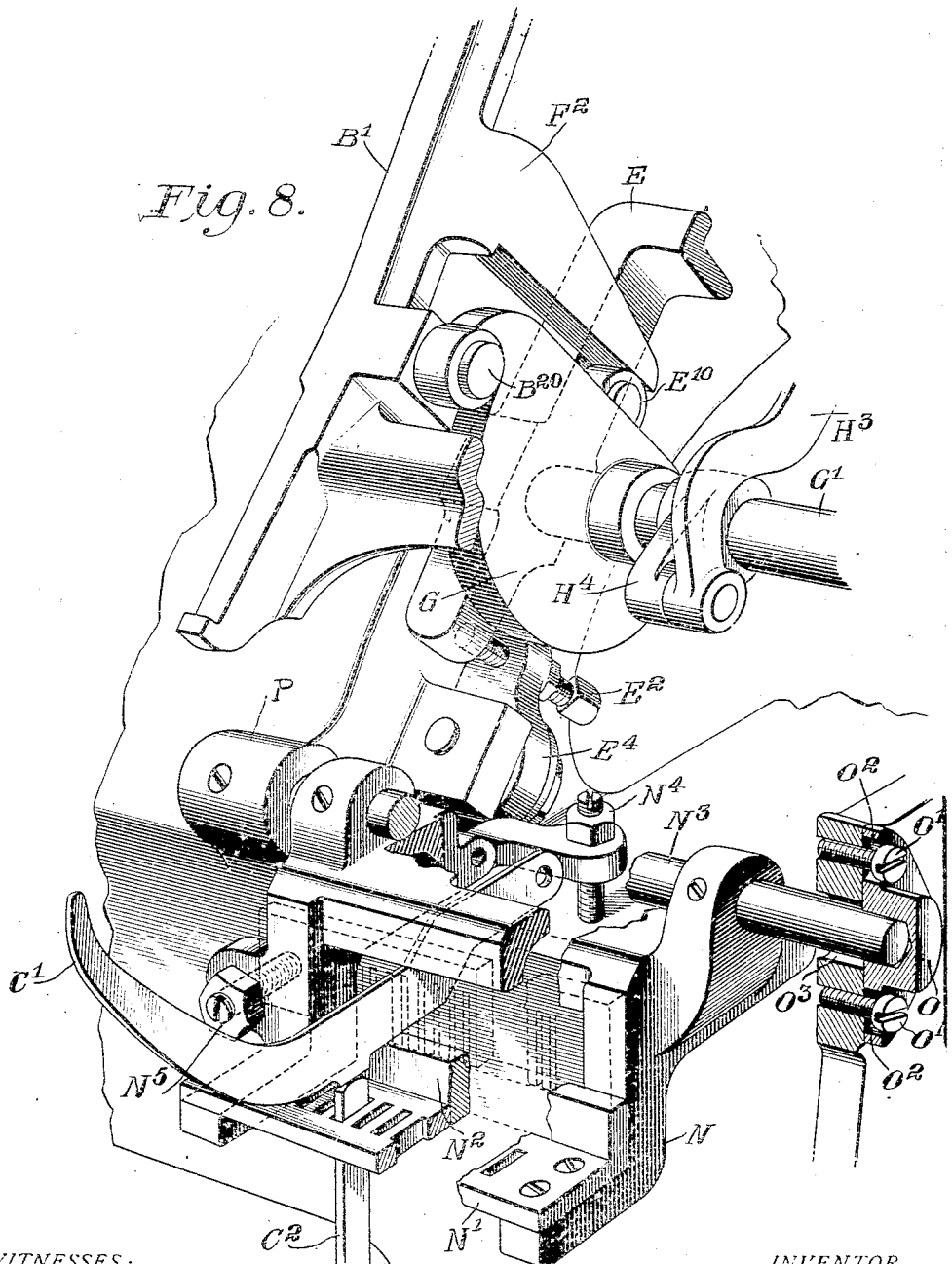

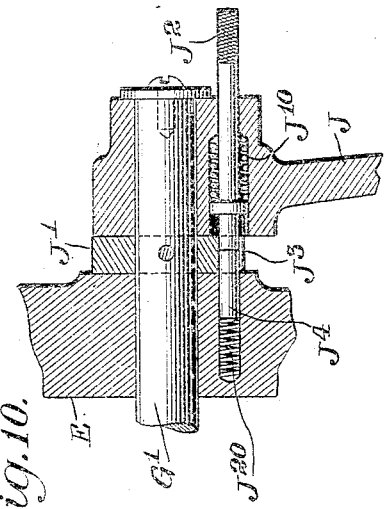
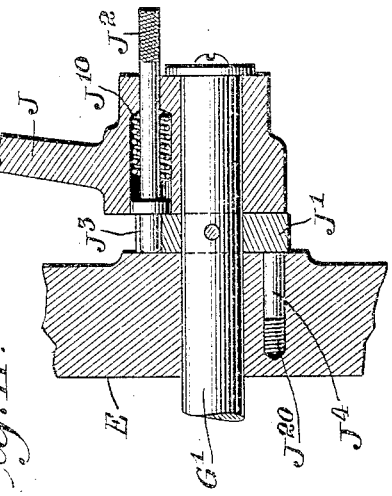
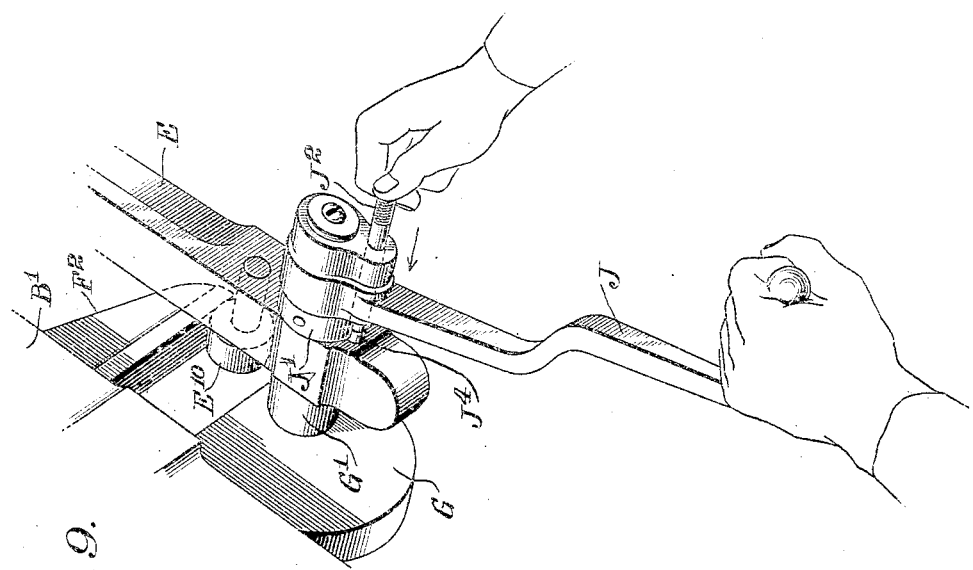

UNITED STATES PATENT OFFICE.

DAVID S. KENNEDY, OF NEW YORK, N. Y., ASSIGNOR TO MERGENTHALER LINOTYPE COMPANY, A CORPORATION OF NEW YORK.

TYPOGRAPHICAL MACHINE.

1,104,512.     Specification of Letters Patent.     Patented July 21, 1914.

Application filed February 1, 1913. Serial No. 745,609.

*To all whom it may concern:*

Be it known that I, DAVID S. KENNEDY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436,532, to O. Mergenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter elevated and returned through a distributing mechanism to the magazine from which they started.

More particularly, it relates to the use of a number of fonts or sets of matrices representing different sizes or styles of type, in such manner that any font may be brought into action at will; and to this end I preferably employ a series of superposed magazines in combination with means for shifting them and for bringing any selected one into operative position.

The particular construction of the parts will be described in the specification and finally claimed.

One of the principal advantages of my improved arrangement is its capability of adaptation to existing machines without material change therein.

In the accompanying drawings, I have shown my invention in preferred form and by way of example, and as applied to a linotype machine, but obviously many changes and variations may be made therein, and in its mode of application, and still be comprised within its spirit. Thus, the details thereof may be widely varied, and it may be applied to other forms of typographical machines, not only line casting machines which handle matrices, but also type setting, type casting machines, etc., which handle type or dies.

Generally speaking, I desire it to be understood that I do not limit myself to any specific form or embodiment, except in so far as such limitations are specified in the claims.

Figure 1:
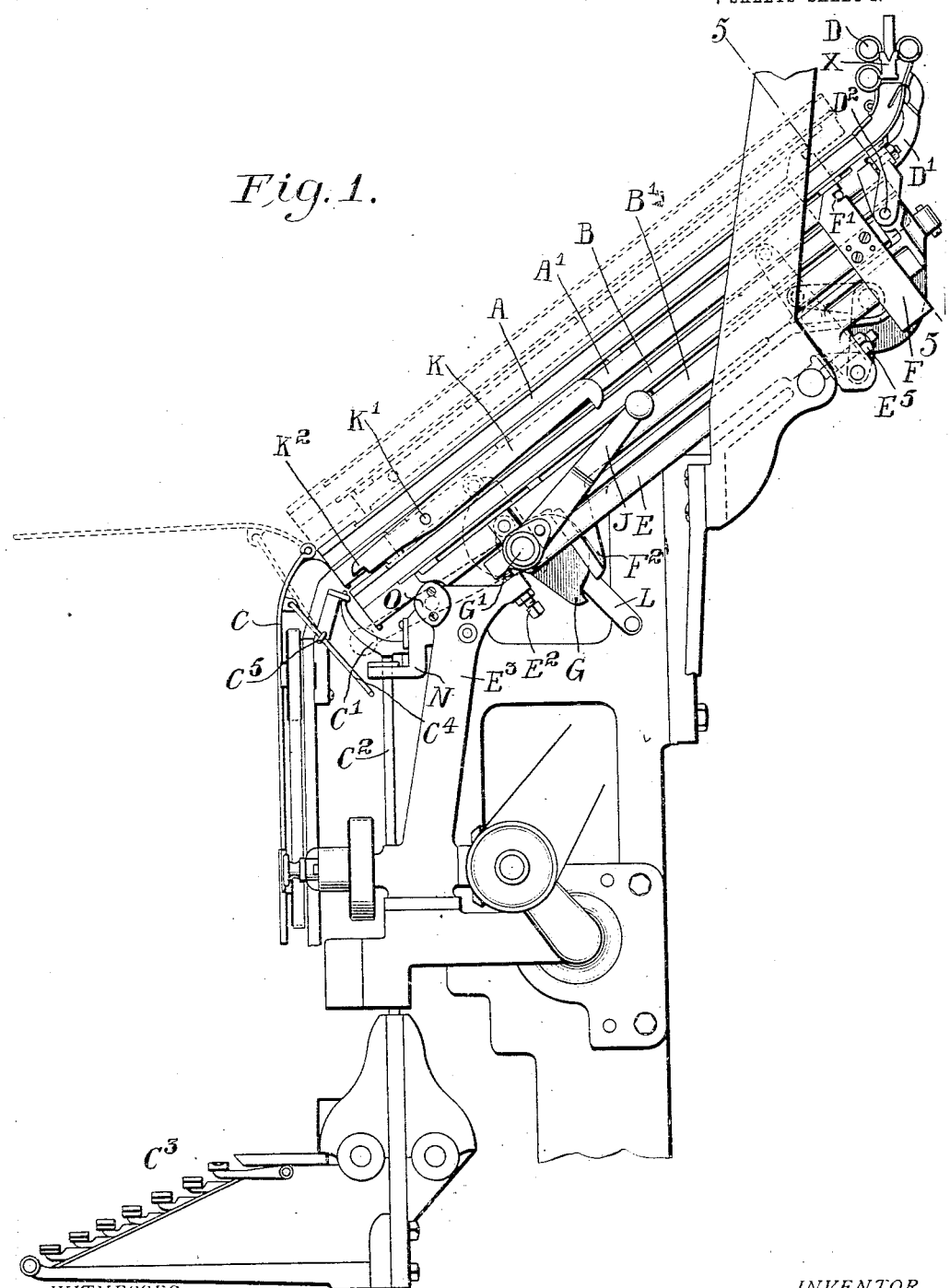
Figure 2:
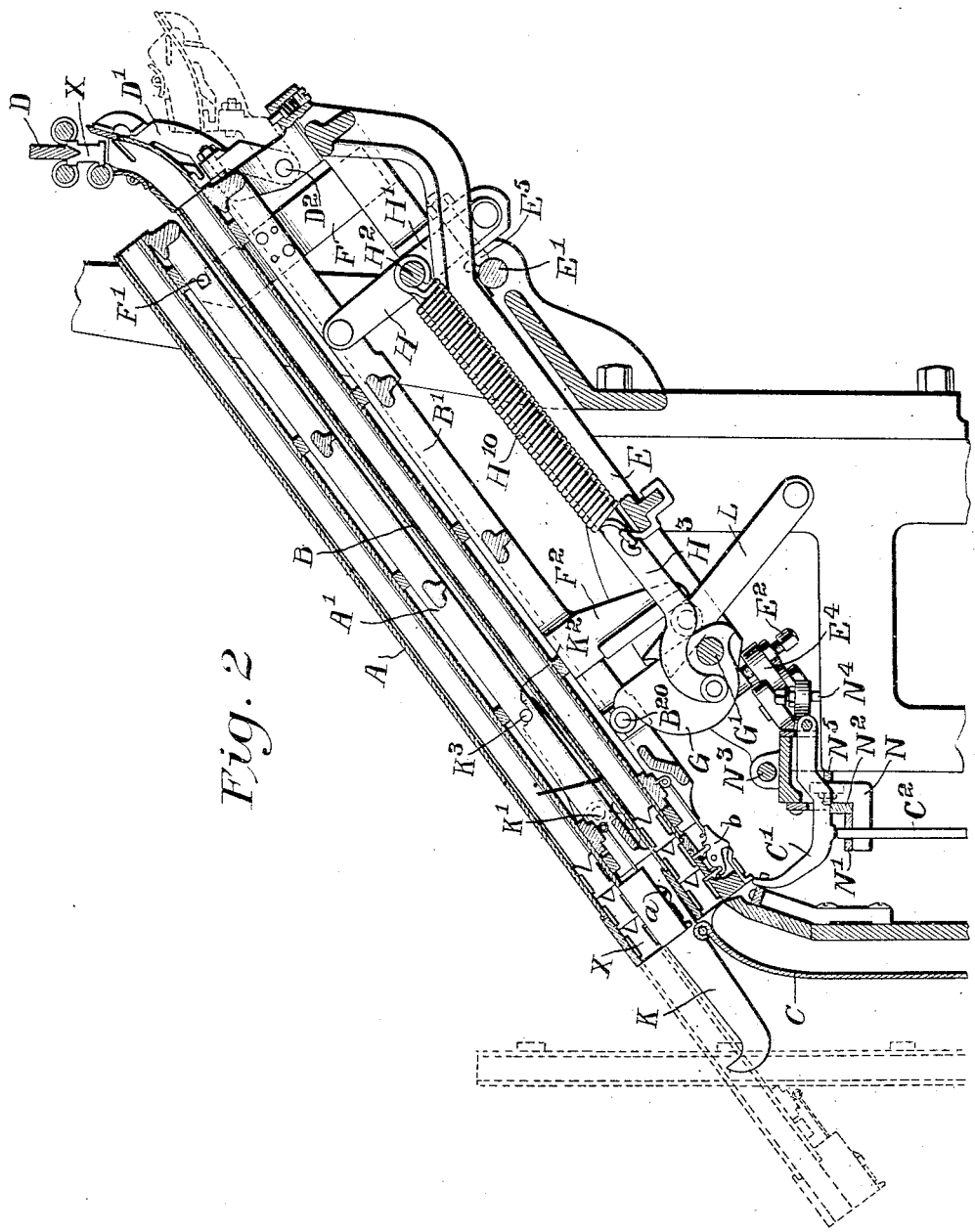
Figure 3:
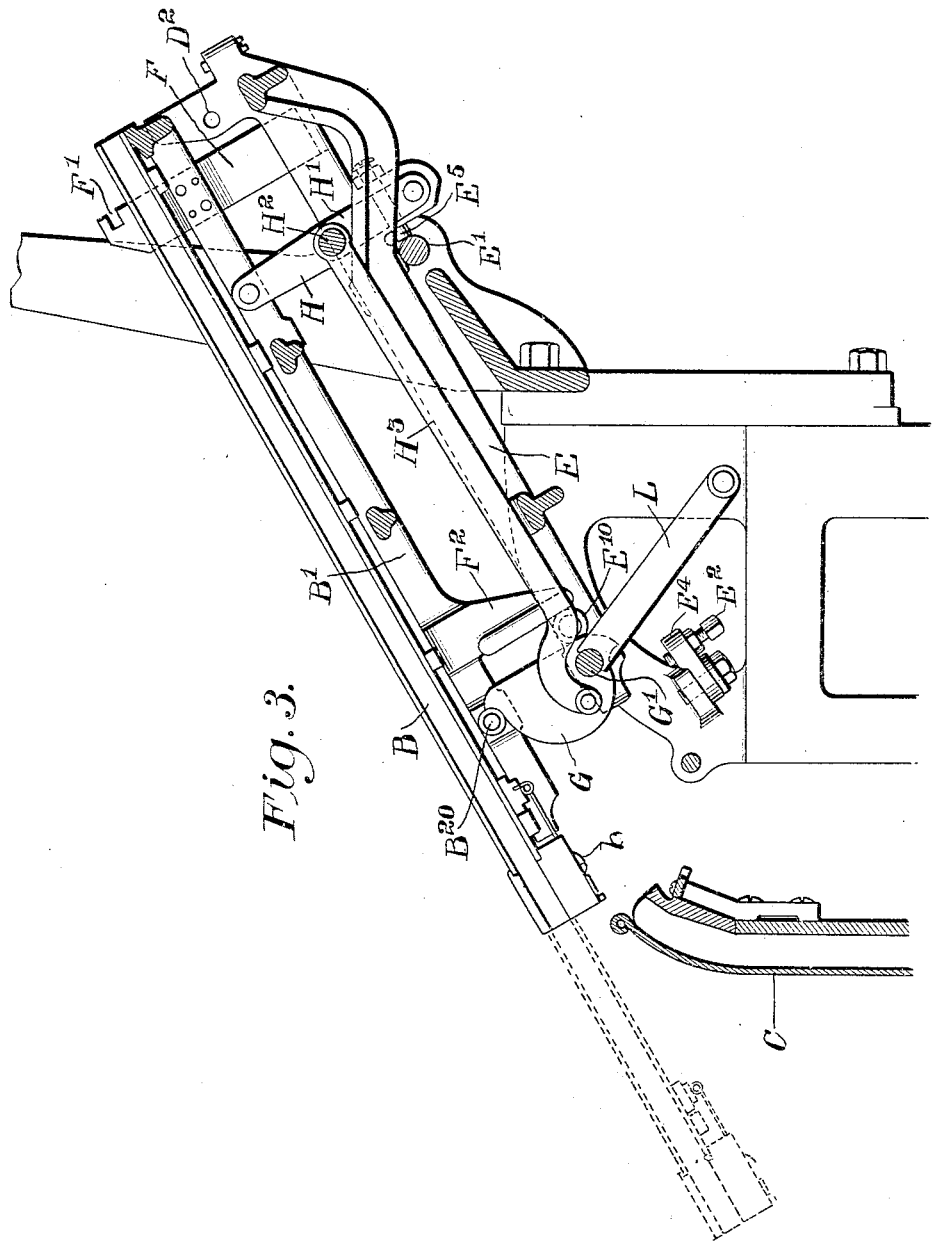
Figure 4:
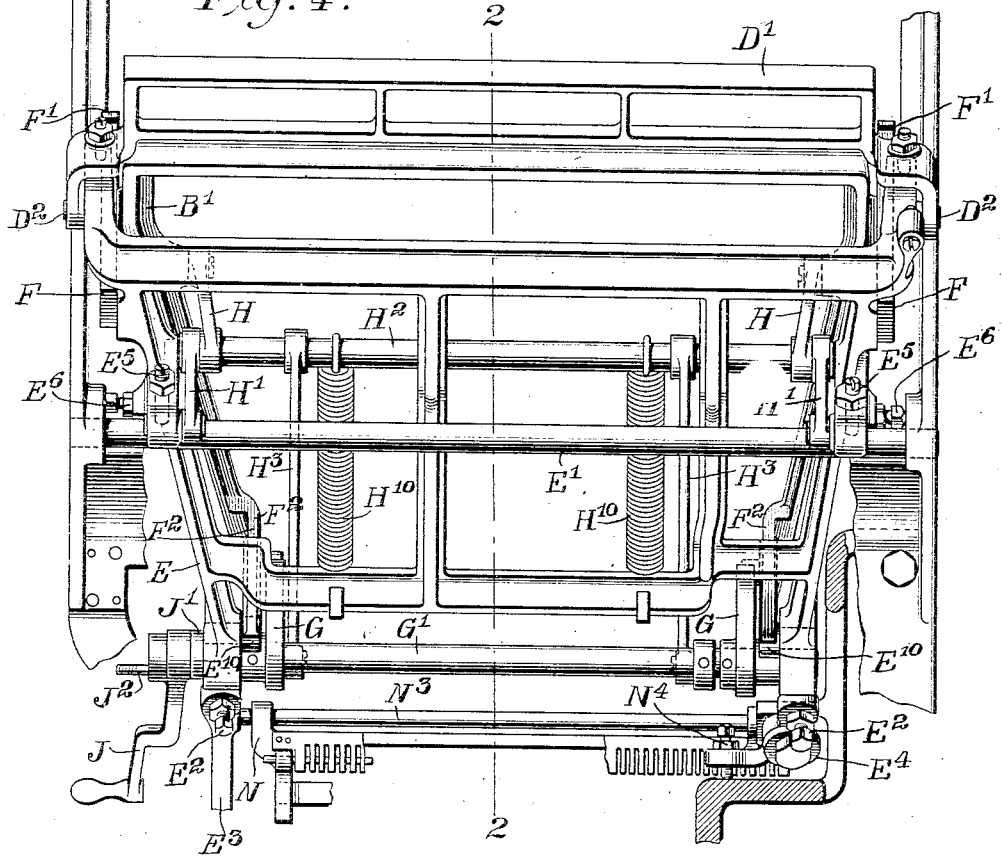
Figure 5:
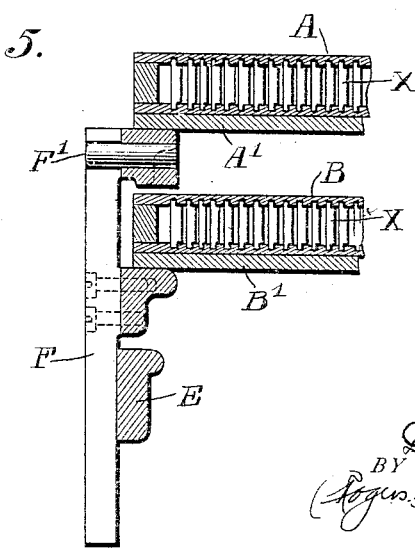

Referring to the drawings: Figure 1 is a side view of a portion of a linotype machine, having my invention applied thereto; Fig. 2 is a transverse vertical section, taken substantially on the line 2—2 in Fig. 4; Fig. 3 is a similar section, showing certain of the parts in different position; Fig. 4 is a rear view, partly broken away, with the magazines removed; Fig. 5 is a sectional detail, taken substantially on the line 5—5 in Fig. 1; Fig. 6 is a perspective view of the magazines, etc., detached; Fig. 7 is a detached perspective of the frame which supports the magazines, their base frames, etc.; Fig. 8 is an enlarged perspective, partly broken away, illustrating principally the devices for registering the escapement actuating means; Fig. 9 is an enlarged perspective, showing the operating means for shifting the magazines; and Figs. 10 and 11 are sectional details thereof, illustrating the parts in different position.

The matrices X are stored according to font in the magazines A and B, which may be shifted so as to bring either into operative relation to the face plate C and distributing devices D, in the manner well understood in the art. In the preferred form illustrated, only two such magazines are disclosed, but obviously the number thereof may be increased if desired, as the principles of adjustment and operation apply similarly to a greater number. The magazines A and B are respectively equipped with series or banks of escapements $a$ and $b$, and as each magazine is selected and moved into position, its escapements are thereby brought into proper relation to a single series or bank of escapement actuating levers $C^1$, which are operated by the reeds $C^2$ from the keyboard mechanism $C^3$, all in the usual manner.

The magazines A and B are mounted upon the customary base frames $A^1$ and $B^1$, which in turn are connected to the supporting frame E, and with reference to which they may be shifted to bring the selected magazine into operative position. The supporting frame E rests upon and is in turn sustained by the framework of the machine, so that, together with the parts carried thereby, it may be removed and replaced at will, and so also that it may be moved relatively thereto to permit the free and unimpeded removal of the magazines and their base frames therefrom. This arrangement is of great importance, in that it not only facilitates the manipulation of the parts, but also allows my improvements to be applied and adapted to existing machines, with a minimum of alteration therein.

The frame E near its rear rests upon the transverse rod $E^1$, and at its front upon two adjusting screws $E^2$, $E^2$, the right hand one of which is connected to the ordinary arm or bracket $E^3$, and the left hand one of which is carried by a supporting plate $E^4$, suitably connected to the opposite side of the framework. The frame E is thus mounted in inclined position, and is prevented from sliding forwardly by the engagement with the rod $E^1$ of oppositely-located adjusting screws $E^5$ carried by rigid arms depending from the frame. The frame E is also provided with two oppositely-located, laterally-extending adjusting screws $E^6$, which abut against the inner sides of the main framework, as best shown in Figs. 4 and 7. By the several devices described, the frame may be adjusted to any desired and proper extent, the screws $E^2$ effecting the vertical or tilting adjustment, the screws $E^5$ the longitudinal adjustment, and the screws $E^6$ the lateral adjustment; and moreover, as these respective screws are arranged in pairs, and at opposite sides of the frame, the latter may be twisted or turned by their individual manipulation so as to secure in effect a universal adjustment.

As previously stated, the magazines A and B, and their base frames $A^1$ and $B^1$, may be shifted relatively to the supporting frame E so as to bring the selected magazine into operative position. The lower base frame $B^1$ is provided at opposite sides, and near the upper end thereof, with guiding pieces F, which extend downwardly outside of and in close proximity to the sides of the frame E, so that when the frame $B^1$ is shifted vertically with reference thereto, the sliding engagement of the pieces F serves to guide and hold the moved parts in accurate relationship thereto. Near its lower end, the frame $B^1$ is provided at opposite sides with downwardly depending lugs or arms $F^2$, located within and in close relationship to the frame E at their sides, and at their forward edges bearing against and resting upon the anti-friction rolls $E^{10}$ connected to the frame E. The arms $F^2$ thus serve a double function, by their lateral sliding engagement with the frame E, they act as vertical guides similar to the previously mentioned guides F, and by their engagement with the rolls $E^{10}$ they hold the frame $B^1$ and the supported parts from forward or downward movement.

The magazine B rests upon the base frame $B^1$ in the usual manner, and the upper base frame $A^1$ in turn lies upon the magazine B, it being pivotally connected near its upper end, and at opposite sides thereof, to upward extensions of the guides F, as by the open slots $F^1$, in such manner that it may be readily disengaged therefrom when desired. The magazine A rests upon and is carried by the base frame $A^1$.

In order to effect the vertical shifting of the magazines with reference to the supporting frame E, so that either one may be brought into operative position, I provide means carried by said frame, which will now be described. Near the forward end of the frame E, and at opposite sides thereof, are located two elevating cams G upon a transverse rock shaft $G^1$ suitably journaled in the frame. These cams are located in operative relation to the cam rolls $B^{20}$, mounted at opposite sides upon the base frame $B^1$. At the rear or upper portion of the supporting frame E, and at opposite sides thereof, are provided two pairs of toggle links H and $H^1$, the upper members H being connected at one end to the base frame $B^1$, and the lower members $H^1$ at one end to the supporting frame E. The respective upper and lower members H and $H^1$ are intermediately connected to a common transverse rod $H^2$, which acts to straighten out the compound toggle system. The rod $H^2$ is connected by a pair of longitudinal links $H^3$ to the cam mechanism at the front side of the frame E, either directly to eccentric studs on the cams G, as shown in Figs. 2 and 3, or to short arms $H^4$ fixed to the rock shaft $G^1$, as shown in Figs. 7 and 8.

It will be apparent that when the shaft $G^1$ is rocked, the cams G and toggles H, $H^1$, will act to elevate the base frame $B^1$ simultaneously and in parallelism. Moreover, when the parts are thus manipulated, as shown in Fig. 2, the elevated magazines will be held rigidly in position, at the rear end by the straightened toggle joints H, $H^1$, and at the front end by the rolls $B^{20}$ resting upon the cams G; the tendency to forward movement being adequately resisted by the engagement of the depending arms $F^2$ with the rolls $E^{10}$. This position is further insured by the powerful springs $H^{10}$ connecting the toggle rod $H^2$ to a transverse bar at the forward end of the supporting frame E, the tendency of these springs being to hold the toggle joints in extended condition. Moreover, the springs $H^{10}$ also serve as a counterbalance to the weight of the magazines, etc., diminish the manual effort required to shift them, and act to render the shifting movements more certain and uniform.

Due to the construction and arrangement described, the selected magazine is held firmly in position. In Fig. 1, the upper magazine A is illustrated in operative relation to the assembling and distrbuting devices, at which time the superimposed magazines and base frames rest directly upon the supporting frame E. In Fig. 2, the lower magazine B is shown in operation, at which time the parts are securely held by the cams, toggle joints, etc., in the manner previously indicated.

The means for rocking the shaft $G^1$ comprise a hand lever J, the details of which are illustrated in Figs. 9, 10 and 11. The arm or lever J is loosely mounted upon the rock shaft $G^1$, in immediate proximity to the collar $J^1$ fast thereon and formed with a transverse recess or notch $J^3$, adapted to receive the longitudinally movable pin $J^2$ mounted in the arm J. The pin $J^2$ is provided with a spring $J^{10}$, which normally engages the pin in the recess, the spring having only sufficient strength to insert the pin partially therein, as shown in Fig. 10. The arm J is ordinarily in the position indicated in Fig. 1, and when it is desired to elevate the magazines, it is moved forwardly through an angle of approximately 180°. In order to lock the parts in this position, the frame E is provided with a plunger $J^4$, normally urged outward by the spring $J^{20}$, so that the plunger enters the recess $J^3$, when the latter registers therewith, and thus holds the collar $J^1$ and rock shaft $G^1$ against rotation. The spring $J^{20}$ similarly has only sufficient strength to insert the plunger $J^4$ partially in the recess $J^3$, as shown in Fig. 10, wherein both the pin $J^2$ and plunger $J^4$ are illustrated as engaging the collar $J^1$.

When the magazines have been elevated in the manner described, if it be desired to shift the operating arm J backwardly out of the way, without rotating the rock shaft $G^1$, the pin $J^2$ is moved outward against the pressure of the spring $J^{10}$ and entirely withdrawn from the recess $J^3$, when the arm may be turned rearwardly to its original position, at which time the plunger $J^4$ continues to engage the collar $J^1$ and hold the rock shaft $G^1$ against movement. However, if it be desired to turn the rock shaft $G^1$ so as to lower the magazines, this is effected by the inward movement of the pin $J^2$ (see Fig. 9) until the locking plunger $J^4$ is removed from the recess $J^3$, when due to the connection of the arm J to the collar $J^1$, the shaft $G^1$ may be rocked rearwardly, as indicated in Fig. 11.

My improved construction also permits of the ready removal of the magazines and their interchange and substitution, as desired. As shown in Fig. 2, when the rock shaft $G^1$ is operated to elevate the magazines, this manipulation locates the magazine A in convenient position, so that it may be slid forwardly and detached from its base frame $A^1$, over and without interference with the face plate C and other assembling devices. To facilitate this sliding removal of the magazine A, the base frame $A^1$ is provided at opposite sides with the forwardly-projecting hooks K to engage the transverse bars of the magazine and permit its tilting thereon. These hooks K are pivoted to the sides of the base frame $A^1$ at $K^1$, and are formed with notches or cuts $K^2$, which in operative position are firmly engaged by the laterally projecting pins $K^3$ on the base frame $A^1$. In normal conditions, the hooks K are turned about the pivots $K^1$ inwardly and out of the way, as shown in Fig. 1.

When the parts are in the position shown in Fig. 2, the magazine B may not be conveniently removed, because of its relation to the face plate C. To secure this result, it is therefore necessary to raise the parts to a still higher level, and this is accomplished by the supplementary elevation or tilting of the supporting frame E about the transverse rod $E^1$, as shown in Fig. 3, the parts being held firmly in these relations by the pivoted arm L which may be turned to engage under the rock shaft $G^1$. Assuming that the magazine A has been already removed in the manner indicated in Fig. 2, its base frame $A^1$ may next be detached simply by disengaging it from its pivotal connection at $F^1$ to the guides F, when the magazine B is free to be slid forwardly in the manner indicated in Fig. 3.

Other constructive features of advantage are also provided for in my improved arrangement. Thus, in order to permit the outward swinging of the external member or wall of the face plate C, as indicated by dotted lines in Fig. 1, it is provided with pivoted guide rods $C^4$ which project through eyes or openings $C^5$ connected to the main frame, the angular relation of the rods to the eyes being such that when the member is moved upwardly, they engage or bind so as to hold the member securely and give access to the channels, etc., of the face plate.

The matrices pass from the distributing mechanism to the magazine in position through the customary channel entrance, which entrance or its supporting bracket $D^1$ is pivotally connected to the supporting frame E as at $D^2$. The entrance consequently always retains its proper position relatively to the distributing mechanism and the selected magazine, as the magazines when shifted are moved relatively to the stationary supporting frame E. When it is desired to obtain access to the entrance for any reason, as for instance to permit the removal of a misplaced matrix, the bracket D¹ may be swung downward about the pivots D², as indicated by dotted lines in Fig. 2.

I have also provided adjustable means whereby the escapement actuating devices may be accurately located in relation to each other and to the escapements of the magazine in operation, as best shown in Fig. 8. These means comprise the depending bracket N carrying the grid N¹ to guide the upper ends of the reeds C²; and the transverse bar N² to support the actuating levers C¹ in operative relation thereto. The bracket N is preferably suspended from the transverse rod N³, mounted at its left hand end in the bearing member P in the stationary frame-work and at its right hand end projecting through a recess O³ in the stationary framework, and provided with a cap piece O secured to the framework by screws O¹ passing through recesses O² therein and into the framework. It will be observed that the recess O³ in the framework, and the recesses O² in the cap O, are all of them enlarged to a considerable extent, so as to permit a sufficient capability of adjustment for the supporting rod N³. Obviously, if a greater range of adjustment for the rod N³ is desired or required, it may be secured by providing both ends of the rod with devices like those already described as connected to the right hand end. Similarly the bracket N is provided with adjusting screws N⁴ and N⁵ bearing against the framework at opposite sides of the rod N³, whereby its angular position relatively thereto may be regulated. In this way, I am enabled to adjust the reeds and the actuating levers in exact relations to each other and to the escapements, and also I avoid the necessity for extensive fitting, which is usually necessary, as these parts may be applied to existing forms of machines.

As previously stated I have shown my improvements only in preferred form and by way of example, and as applied to a linotype machine, but obviously many changes and modifications therein, and in their mode of application, will suggest themselves to those skilled in the art without departure from their scope.

Having thus described my invention, its construction and mode of operation, what I claim and desire to secure by Letters Patent of the United States is, as follows:

1. In a typographical machine, the combination of a plurality of magazines, with a supporting frame therefor sustained by the machine frame, the magazines being movable toward and from the supporting frame to bring a selected one into operative relation to the other parts.

2. In a typographical machine, the combination of a plurality of magazines, with a supporting frame therefor resting upon and supported by the machine frame, the magazines being movable toward and from the supporting frame to bring a selected one into operative relation to the other parts.

3. In a typographical machine, the combination of a plurality of magazines, means to connect the magazines and hold them in relation to each other, and a frame to support the magazines and their connecting means, the said magazines and connecting means being movable toward and from the supporting frame to bring a selected magazine into operative relation to the other parts, and the said supporting frame being in turn sustained by the machine frame.

4. In a typographical machine, the combination of a plurality of magazines, a corresponding plurality of base frames therefor, and connections between said base frames, and a supporting frame for the magazines and their base frames, the said magazines and their base frames being movable toward and from the supporting frame to bring a selected magazine into operative relation to the other parts, and the said supporting frame being in turn sustained by the machine frame.

5. In a typographical machine, the combination of a plurality of magazines connected in series and a supporting frame for said magazines, the said connected magazines being movable toward and from the supporting frame to bring a selected one into operative relation to the other parts, and the supporting frame resting upon and being in turn sustained by the machine frame.

6. In a typographical machine, the combination of the machine frame, a supporting frame E mounted thereon, and the magazines supported by the frame E and movable toward and from the same to bring a selected one into operative relation to the other parts.

7. In a typographical machine, the combination of the machine frame, a supporting frame mounted thereon and the magazines having base frames sustained by said supporting frame and movable toward and from the same to bring a selected magazine into operative relation to the other parts.

8. In a typographical machine, the combination of the machine frame, assembling devices mounted therein, a magazine supporting frame also mounted in the machine frame, a magazine movable relatively to the supporting frame to bring it into operative relation to the assembling devices, and means for adjusting the magazine supporting frame to insure the proper coöperative relation between the magazine and the assembling devices.

9. In a typographical machine, the combination of the machine frame, assembling devices mounted therein, a magazine supporting frame also mounted on the machine frame, a magazine movable relatively to the supporting frame to bring it into operative relation to the assembling devices, and adjusting means whereby a universal adjustment of the supporting frame with reference to the machine frame may be secured to insure the proper coöperative relation between the magazine and the assembling devices.

10. In a typographical machine, the combination of the machine frame, the magazine supporting frame E sustained thereby, and a magazine movable toward and from the frame E to bring it into operative relation to the other parts, the forward end of the supporting frame E resting upon a screw $E^2$ connected to the machine frame, and a second screw $E^3$ connected to the member $E^4$ supported by the machine frame.

11. In a typographical machine, the combination of the machine frame, the magazine supporting frame E sustained thereby, a magazine movable relatively to the supporting frame E to bring it into operative relation to the other parts, means $E^2$ to effect the vertical or tilting adjustment of the supporting frame E, means $E^5$ to effect its longitudinal adjustment, and means $E^6$ to effect its lateral adjustment.

12. In a typographical machine, the combination of the machine frame, the magazine supporting frame E sustained thereby, a magazine movable relatively to the supporting frame E to bring it into operative relation to the other parts, a pair of oppositely located devices $E^2$ for vertical or tilting adjustment of the supporting frame E, a pair of oppositely located devices $E^5$ for its longitudinal adjustment, and a pair of oppositely located devices $E^6$ for its lateral adjustment; whereby a universal adjustment of the frame E may be secured.

13. In a typographical machine, the combination of the machine frame, the magazine supporting frame E sustained thereby, a magazine movable relatively to the supporting frame E to bring it into operative relation to the other parts, and the devices $E^6$ whereby the lateral adjustment of the frame E with reference to the machine frame may be secured.

14. In a typographical machine, the combination of the supporting frame E resting upon the machine frame, a magazine movable toward and from the frame E, and guiding means to insure the proper movement of the magazine relatively to the frame E.

15. In a typographical machine, the combination of the supporting frame E resting upon the machine frame, a magazine movable toward and from the frame E, and the guides F to insure the proper movement of the magazine relatively to the frame E.

16. In a typographical machine, the combination of the supporting frame E resting upon the machine frame, a magazine movable toward and from the frame E, and the guides F and $F^2$ to insure the correct lateral relation of the parts during their relative movement.

17. In a typographical machine, the combination of the supporting frame E resting in an inclined position upon the machine frame, a magazine movable vertically in a straight path relatively thereto, and the guides F and $F^2$ to insure the correct lateral relation of the parts during their relative movement, and the latter preventing the forward or downward movement of the magazine.

18. In a typographical machine, the combination of the magazines A and B, their respective base frames $A^1$ and $B^1$, and the pieces F attached to one of the frames and pivotally connected to the other thereof.

19. In a typographical machine, the combination of a magazine supporting frame, a magazine movable toward and from the frame to bring it into operative relation to the other parts, and means for effecting such movement, said means being carried by the supporting frame.

20. In a typographical machine, the combination of a magazine supporting frame, a plurality of magazines movable toward and from the frame to bring a selected one into operative relation to the other parts, and means for effecting such movement, said means being carried by the supporting frame.

21. In a typographical machine, the combination of a supporting frame removably mounted upon the machine frame, a magazine movable toward and from the frame to shift it into or out of operative relation to the other parts, and means for effecting such movement, said means being carried by the removable supporting frame.

22. In a typographical machine, the combination of distributing mechanism, a plurality of magazines facing in the same direction and movable as a whole to shift one into and another out of operative relation to the distributing mechanism, and means for effecting such movement of the magazines, the said means being mounted upon the machine frame so as to be removable therefrom as a whole.

23. In a typographical machine, the combination of distributing mechanism, a plurality of magazines movable as a whole to bring one or another into operative relation to the distributing mechanism, and means for effecting such movement, the said means comprising a toggle system acting in its extended condition to bring one magazine into operative position and in its collapsed condition to bring a different magazine into operative position.

24. In a typographical machine, the combination of distributing mechanism, a plurality of magazines movable as a whole to bring one or another into operative relation to the distributing mechanism, and means for effecting such movement, the said means comprising a toggle system to operate at one portion of the magazines, and a cam system to operate at another portion thereof.

25. In a typographical machine, the combination of distributing mechanism, a plurality of magazines movable as a whole to bring one or another into operative relation to the distributing mechanism, and means for effecting such movement, the said means comprising a toggle system acting in its extended condition to bring one magazine into operative position and in its collapsed condition to bring a different magazine into operative position, and counterbalancing devices connected thereto.

26. In a typographical machine, the combination of distributing mechanism, a plurality of magazines movable as a whole to bring one or another into operative relation to the distributing mechanism, and means for effecting such movement, the said means comprising a toggle system to operate at one portion of the magazines, a cam system to operate at another portion thereof, and connections between the two systems.

27. In a typographical machine, the combination of distributing mechanism, a plurality of magazines movable as a whole to bring one or another into operative relation to the distributing mechanism, and means for effecting such movement, the said means comprising a toggle system to operate at one portion of the magazine, a cam system to operate at another portion thereof, and counterbalancing devices for the two systems.

28. In a typographical machine, the combination of distributing mechanism, a plurality of magazines movable as a whole to bring one or another into operative relation to the distributing mechanism, and means for effecting such movement, the said means comprising the rotary cams $G$, the toggles $H$, $H^1$, and connections whereby the rotary movement of the cams effects the straightening of the toggles.

29. In a typographical machine, the combination of distributing mechanism, a plurality of magazines movable as a whole to bring one or another into operative relation to the distributing mechanism, and means for effecting such movement, the said means comprising the cams $G$, the toggles $H$, $H^1$, and the connecting links $H^3$.

30. In a typographical machine, the combination of distributing mechanism, a plurality of magazines movable as a whole to bring one or another into operative relation to the distributing mechanism, and means for effecting such movement, the said means comprising the toggles $H$, $H^1$, and acting in their straightened condition to bring one magazine into operative position and in their collapsed condition to bring a different magazine into operative position, the springs $H^{10}$ tending constantly to straighten the toggles.

31. In a typographical machine, the combination of distributing mechanism, a plurality of magazines movable as a whole to bring one or another into operative relation to the distributing mechanism, and means for effecting such movement, the said means comprising the rotary cams $G$, the shaft $G^1$ on which the cams are mounted, the toggles $H$, $H^1$, the rod $H^2$ to which the toggles are connected, and the links $H^3$ connected to the rod $H^2$ and the cams $G$ respectively.

32. In a typographical machine, the combination of distributing mechanism, a plurality of magazines movable as a whole to bring one or another into operative relation to the distributing mechanism, and means for effecting such movement, the said means comprising the cams $G$, the toggles $H$, $H^1$, the rod $H^2$ connected to the toggles, the links $H^3$ connected to the rod $H^2$ and the cams $G$ respectively, and the springs $H^{10}$ connected to the rods $H^2$ to counterbalance the weight of the magazines.

33. In a typographical machine, the combination of the supporting frame $E$, a magazine movable toward and from the frame into and out of operative relation to the other parts, and means for effecting such movement, the several elements being so arranged that in one position the magazine is supported directly by the frame $E$, and in another position is held and supported by the said moving means.

34. In a typographical machine, the combination of a shiftable magazine, and means for shifting it into and out of operative relation to the other parts, the said means comprising an operating handle, a shaft upon which the handle is mounted, and connections whereby the handle may be disconnected from the shaft at will without disturbing the position of the magazine.

35. In a typographical machine, the combination of a shiftable magazine and means for shifting it into and out of operative relation to the other parts, the said means comprising the handle $J$, the shaft $G^1$ upon which it is mounted, and the device $J^2$ movable at will to make or break the operative connection of the handle with its shaft, together with the locking plunger J⁴ mounted independently of the handle for holding the shaft against rotation.

36. In a typographical machine, the combination of a shiftable magazine, and means for shifting it into and out of operative relation to the other parts, the said means comprising the handle J, the shaft G¹ upon which is mounted, the collar J¹ fast on the shaft, and the pin J² carried by the handle and movable longitudinally of the shaft to engage it with or disengage it from the collar J¹.

37. In a typographical machine, the combination of a shiftable magazine, and means for shifting it into and out of operative relation to the other parts, the said means comprising the rotary cams G, the shaft G¹ on which they are mounted, the collar J¹ fast on the shaft G¹ and the locking device J⁴ to engage the collar J¹ so as to hold the cams in their shifted position.

38. In a typographical machine, the combination of a shiftable magazine, means for shifting it into and out of operative relation to the other parts, the said means comprising the shaft G¹, collar J¹ formed with the recess J³, the locking device J⁴ to engage said recess, and the handle J provided with the pin J² to engage said recess.

39. In a typographical machine, the combination of a shiftable magazine, means for shifting it into and out of operative relation to the other parts, locking means to engage the same when operated, and an operating handle provided with engaging connection so arranged that when it is operatively connected to the other parts the locking means are disengaged therefrom.

40. In a typographical machine, the magazine shifting mechanism comprising, in combination, the shaft G¹, the collar J¹ formed with the recess J³, the locking device J⁴, and the handle J provided with the connecting pin J², the device J⁴ and pin J² being adapted to operate one upon the other when both register with the said recess.

41. In a typographical machine, the combination of a magazine supporting frame mounted upon the machine frame and movable relatively thereto, and a magazine detachably connected to said frame and movable toward and from the same; whereby the combined movement of the magazine relatively to the supporting frame, and of the supporting frame relatively to the machine frame, brings the magazine into convenient position for its removal.

42. In a typographical machine, the combination of the distributing mechanism, the magazine supporting frame E, and a plurality of magazines carried by the frame and movable relatively thereto to bring one or another into operative relation to the distributing mechanism, the said distributing mechanism comprising the channel entrance D¹ common to all the magazines and connected directly to and carried by the magazine supporting frame.

43. In a typographical machine, the combination of the distributing mechanism, the magazine supporting frame E carried by the machine frame and movable relatively thereto, and a plurality of magazines carried by the frames and movable relatively to the frame E to bring one or another into operative relation to the distributing mechanism, the said distributing mechanism comprising the channel entrance D¹ pivotally connected directly to the frame E at D².

44. A typographical machine comprising in combination, escapement actuating devices, a supporting frame therefor, and a member upon which the frame is adjustably mounted, the said member being also adjustable both vertically and laterally with respect to the machine frame to insure the proper operative relation of the actuating devices to the other parts.

45. In a typographical machine, comprising, in combination, the escapement actuating devices C¹, their supporting frame N, the shaft N³ carrying the supporting frame, and the bearing members O and P wherein the shaft is mounted, the said bearing member O being adjustable to insure the proper operative relation of the actuating devices to the other parts.

46. In a typographical machine, comprising, in combination, the escapement actuating devices C¹, their supporting frame N, the shaft N³ carrying the supporting frame, the bearing members O and P wherein the shaft is mounted, and the adjusting screws O¹ to set said bearing member O in different relative positions on the machine frame, for the purpose described.

47. In a typographical machine, the combination of a shiftable magazine, and means for shifting the magazine into and out of operative position, the said means comprising an operating handle which is movable at will from its operated position without affecting the position of the magazine.

48. In a typographical machine, the combination of a shiftable magazine, and means for shifting the magazine into and out of operative position, the said means comprising an operating handle which is movable at will from its operated position without affecting the position of the magazine, and means for holding the magazine in its shifted position.

49. In a typographical machine, the combination of a shiftable magazine, and means for shifting it into and out of operative position, the said means comprising locking means to hold the magazine in its shifted position, an operating handle, adapted to be connected to and disconnected from the shifting means at will, and devices whereby the connection of the operating handle to the shifting means effects the disengagement of the locking means therefrom.

50. In a typographical machine, the combination of the machine frame, a supporting frame mounted thereon, and a plurality of magazines carried by the supporting frame and facing in the same direction and movable relatively thereto to bring one or another into operative relation to the other parts.

51. In a typographical machine, the combination of the machine frame, a supporting frame mounted thereon and a further frame carrying a plurality of magazines which face in the same direction, the latter frame being movable relatively to the supporting frame to bring one or another of its magazines into operative relation to the other parts.

52. In a typographical machine, the combination of a supporting frame, a plurality of magazines carried by the frame and facing in the same direction, and means mounted in the supporting frame for shifting the magazines relatively thereto to bring one or another of them into operative relation to the other parts.

53. In a typographical machine, the combination of a supporting frame, and a plurality of magazines carried by the frame and facing in the same direction and movable relatively thereto to bring one or another magazine into operative relation to the other parts, the said supporting frame being movable at will from its operative position to permit the removal of the magazines.

54. In a typographical machine, the combination of a supporting frame, and a second frame mounted thereon and carrying a plurality of magazines facing in the same direction, the latter frame being movable relatively to the former to bring one or another of the magazines into operative relation to the other parts, and the first frame being movable at will from its operative position to permit the removal of the magazines.

55. In a typographical machine, the combination of a plurality of magazines facing in the same direction, a supporting frame therefor, and means mounted in the supporting frame for shifting the magazines relatively thereto to locate one or another magazine in operative position, the said supporting frame being movable at will from its operative position to permit the removal of the magazines.

In testimony whereof I affix my signature in presence of two witnesses.

DAVID S. KENNEDY.

Witnesses:
ALFRED W. F. GUEST,
HAROLD A. BURT.